United States Patent [19]

Kimura et al.

[11] Patent Number: 5,322,318
[45] Date of Patent: Jun. 21, 1994

[54] AUTOMOTIVE SUSPENSION SYSTEM FOR ANTI-ROLLING CONTROL

[75] Inventors: Makoto Kimura; Fumiyuki Yamaoka; Shinobu Kakizaki; Toru Takahashi; Mitsuo Sasaki, all of Atsugi, Japan

[73] Assignee: Atsugi Unisia Corporation, Japan

[21] Appl. No.: 990,444

[22] Filed: Dec. 15, 1992

[30] Foreign Application Priority Data

Dec. 17, 1991 [JP] Japan ................. 3-333452

[51] Int. Cl.⁵ .................. B60G 17/00; F16F 9/00
[52] U.S. Cl. ...................... 280/689; 280/707
[58] Field of Search ............. 280/707, 714, 703, 772, 280/6.12, 689

[56] References Cited

U.S. PATENT DOCUMENTS

| | | | |
|---|---|---|---|
| 4,572,317 | 2/1986 | Isono et al. | 280/707 |
| 4,621,832 | 11/1986 | Nakashima et al. | 280/707 |
| 4,821,191 | 4/1989 | Ikemoto | 280/707 |
| 4,852,905 | 8/1989 | Tanaka et al. | 280/707 |
| 4,853,860 | 8/1989 | Achenbach | 280/707 |
| 4,948,163 | 8/1990 | Kikushima | 280/707 |
| 5,037,128 | 8/1991 | Okuyama et al. | 280/703 |

FOREIGN PATENT DOCUMENTS

61-184114 8/1986 Japan.
2-38130 2/1990 Japan ............................. 280/707

*Primary Examiner*—Karin L. Tyson
*Attorney, Agent, or Firm*—Ronald P. Kananen

[57] ABSTRACT

An anti-rolling motion control system for an automotive vehicle is provided. This control system comprises shock absorbers each being variable of a damping coefficient within a range from softer to harder damping characteristics, a steering sensor for monitoring a steered angle of a steering wheel, and a rolling motion control unit. The rolling motion control unit is operable to derive steered angular velocity based on the steered angle of the steering wheel. The rolling motion control unit controls the shock absorbers so that the damping coefficients are modified to exhibit the harder damping characteristics when the steered angular velocity and the steered angle are greater than preselected first and second threshold values respectively for suppressing rolling motion of a vehicle body effectively while securing traveling stability.

8 Claims, 9 Drawing Sheets

AUTOMOTIVE SUSPENSION SYSTEM FOR ANTI-ROLLING CONTROL

BACKGROUND OF THE INVENTION

1. Field of the Invention

The present invention relates generally to a suspension control system for an automotive vehicle. More particularly, the invention is directed to a suspension control system which is operable to vary damping coefficients of shock absorbers for suppressing rolling motion of a vehicle body when turning.

2. Description of the Prior Art

Japanese Patent First Publication No. 61-184114 discloses an anti-rolling motion control suspension system for an automotive vehicle. This suspension system is operable to detect steered angular velocity and controls shock absorbers to exhibit high damping coefficients when the detected steered angular velocity is greater than a preselected threshold value for suppressing rolling motion of a vehicle body.

However, such a prior art suspension system encounters a drawback in that when a threshold value of a steered angular velocity is set to a relatively small value for enhancing sensitivity of anti-rolling motion control, a shock absorber tends to be modified to assume a high damping coefficient even when a steered angle is a small value which does not require the anti-rolling motion control, resulting in vehicle riding comfort being degraded. Alternatively, a greater threshold value of the steered angular velocity causes the sensitivity of the anti-rolling motion control to be reduced, inducing a control response rate to be delayed when quick and/or additional steering operations are made.

SUMMARY OF THE INVENTION

It is therefore a principal object of the present invention to avoid the disadvantages of the prior art.

It is another object of the invention to provide a suspension control system for an automotive vehicle which serves to enhance sensitivity of anti-rolling motion control to improve traveling stability, while securing riding comfort.

According to one aspect of the present invention, there is provided a suspension control system for a vehicle which comprises shock absorbers disposed between a vehicle body and suspension members rotatably supporting wheels respectively, each shock absorber being variable of damping coefficient within a range from softer to harder damping characteristics, a vehicle attitude change determining means for determining a preselected vehicle attitude change parameter to provide a signal indicative thereof, a damping coefficient adjusting means for modifying the damping coefficients of the shock absorbers respectively, a steered angle determining means for determining a steered angle of the vehicle to provide a signal indicative thereof, a steered angular velocity determining means for determining a steered angular velocity of the vehicle to provide a signal indicative thereof, and a control means responsive to the signals from the vehicle attitude change determining means, the steered angle determining means, and the steered angular velocity determining means to provide control signals to the damping coefficient adjusting means when the steered angular velocity and the steered angle are greater than preselected first and second threshold values respectively so that the damping coefficients of the shock absorbers in a preselected direction of stroke are modified to a preselected higher damping coefficient which exhibits the harder damping characteristics based on the vehicle attitude change parameter for suppressing rolling motion of the vehicle body.

In the preferred mode, the steered angle may be determined based on a steered angle difference from a neutral steered angle of the vehicle. When the steered angular velocity determined by the steered angular velocity determining means is kept less than the first threshold value for a preselected period of time, a value of the neutral steered angle is updated to a value of the steered angle determined by the steered angle determining means.

Additionally, the control means may modify the damping coefficient during a compression stroke of the shock absorber arranged at a portion of the vehicle body lowered caused by the rolling motion to the harder damping characteristics and the damping coefficient during an extension stroke of the shock absorber arranged at a portion of the vehicle body lifted up caused by the rolling motion to the harder damping characteristics. The control means may also modify the damping coefficient during the extension stroke of the shock absorber arranged at the portion of the vehicle body lowered caused by the rolling motion to softer damping characteristics and the damping coefficient during the compression stroke of the shock absorber arranged at the portion of the vehicle body lifted up caused by the rolling motion to the softer damping characteristics.

Further, the second threshold value may be determined in a preselected relation to the steered angular velocity and vehicle speed.

BRIEF DESCRIPTION OF THE DRAWINGS

The present invention will be understood more fully from the detailed description given hereinbelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENT

Figure 1:
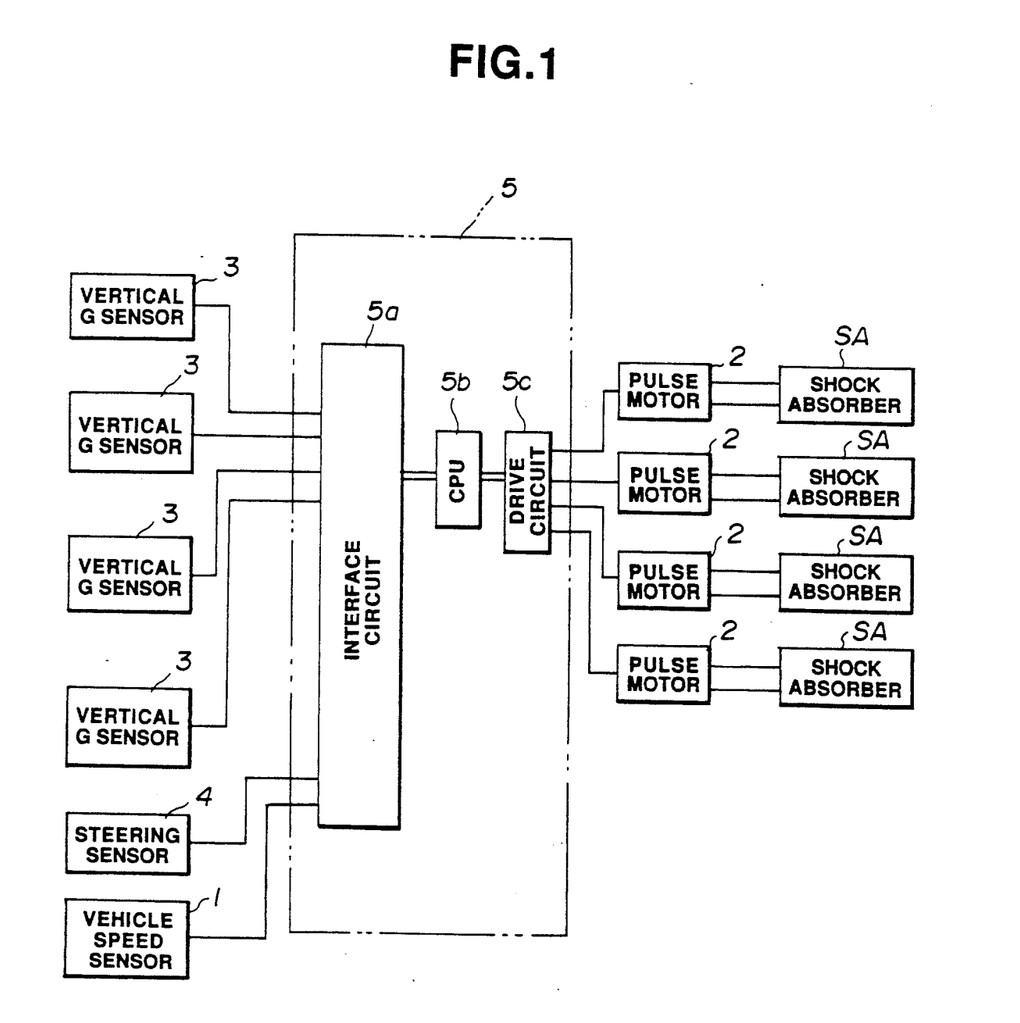
FIG. 1 is a block diagram which shows a suspension control system for anti-rolling control according to the present invention.

Referring now to the drawings, particularly to FIG. 1, a suspension control system for anti-rolling motion control according to the present invention is shown. This suspension system includes generally four suspension units comprised of shock absorbers SA, pulse motors 2, vertical acceleration sensors 3, (hereinafter referred to as a vertical G sensor), a steering sensor 4, a vehicle speed sensor 1, and a control unit 5.

Each of the shock absorbers SA is disposed between a vehicle body and a suspension member supporting a road wheel rotatably. The vertical G sensors 3 are mounted on sprung portions of the vehicle body adjacent the shock absorbers for monitoring vertical accelerations acting on the vehicle body respectively to provide signals indicative thereof to the control unit 5. The steering sensor 4 is attached to a steering wheel (not shown) which detects a steered angle of the steering wheel representing an actual steered angle of the front wheels and provides a signal indicative thereof to the control unit 5. The vehicle speed sensor 1 is operable to detect vehicle speed to provide a signal indicative thereof. The control unit 5 is arranged adjacent a driver's seat and is responsive to the signals from the vertical G sensors 3, the steering sensor 4, and the vehicle speed sensor 1 to provide control signals to the pulse motors 2 of the shock absorbers SA for modifying damping coefficients (i.e., damping forces) thereof to suppress vehicle attitude change.

Figure 2:
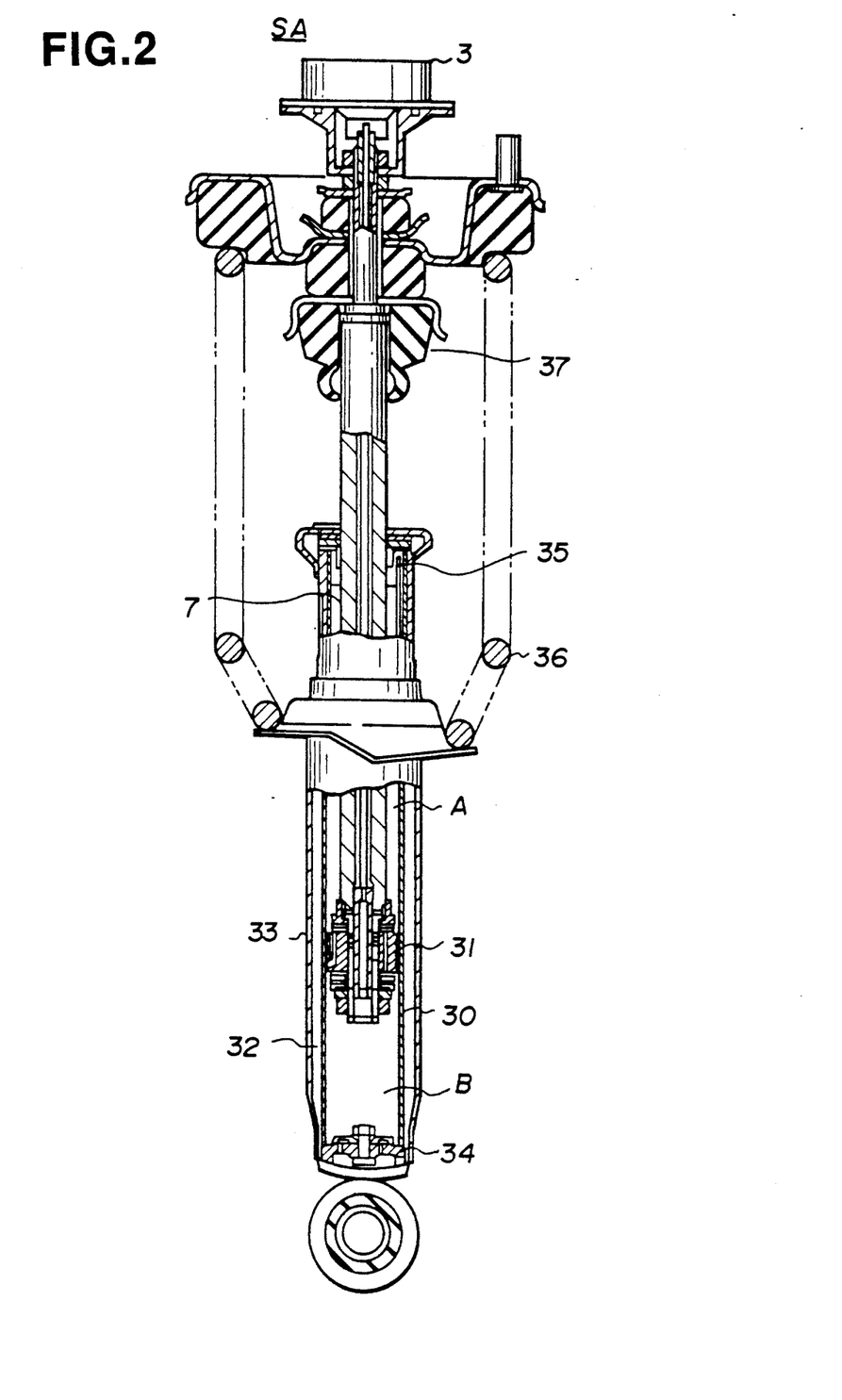
FIG. 2 is a cross-sectional view which shows a variable damping force shock absorber utilized for suppressing vehicle rolling motion.

Referring to FIG. 2, a cross-sectional structure of each shock absorber SA is shown. The shock absorber SA includes an inner cylinder 30, a piston assembly 31 for defining upper chamber A and lower chamber B, an outer cylinder 33 for defining a reservoir chamber 30 between the outer cylinder 33 and the inner cylinder 30, a base or bottom member 34 for defining the lower chamber B and the reservoir chamber 32, a guide member for guiding slide movement of a piston rod 7 linked to the piston assembly 31, a suspension spring 36 interposed between a flange installed on the outer cylinder 33 and the vehicle body, and a bumper rubber member (or bushing) 37.

Figure 3:
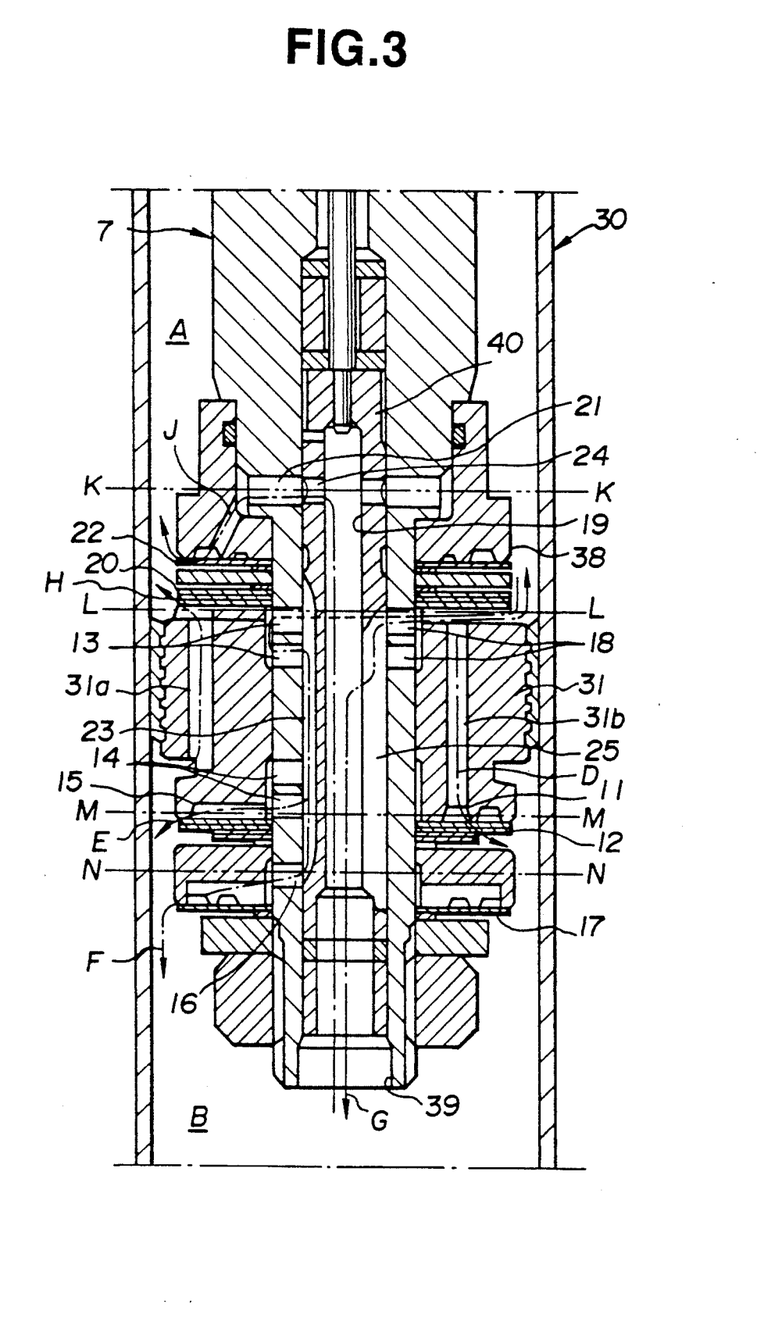
FIG. 3 is an enlarged cross-sectional view which shows a piston assembly of a shock absorber.

Referring to FIG. 3, there is shown a cross-sectional structure of the piston assembly 31. The piston assembly 31 includes penetrating holes 31a and 31b, an extension phase damping valve 12, and a compression phase damping valve 20. The extension and compression phase damping valves 12 and 20 serve to open and close the penetrating holes 31a and 31b respectively.

The piston assembly 31 further includes a piston rod 7, a communication hole 39, an adjusting pin 40, an extension phase check valve 17, a compression phase check valve 22, and a retainer 38 as a valve seat for the check valve 22. The piston rod 7 passes through the piston assembly 31. The communication hole 39 is formed in an end portion of the piston rod 7 which fluidly communicates between the upper chamber A and the lower chamber B. The adjusting pin 40 includes a hollow portion 19, a lateral hole 24, an axial slot 25, and a longitudinal groove 23 in an outer periphery thereof. The adjusting pin 40 is supported by the piston rod 7 so as to be allowed to circumferentially rotate for modifying a flow passage cross-sectional area of the communication hole 39. The rotational movement of the adjusting pin 40 is, as shown in FIG. 2, controlled by the pulse motor 3. The extension phase check valve 17 is operable to allow a working fluid to flow from the upper to lower chambers A and B, while the compression phase check valve 22 allows fluid flow from the lower to upper chambers B and A. Additionally, provided in an end portion of the piston rod 7 are a first port 21, a second port 13, a third port 18, a fourth port 14, and a fifth port 16 (as they will be referred to hereinafter).

Hence, four fluid flow passages are formed between the upper chamber A and the lower chamber B as fluid flow communicable passages during an extension or rebounding stroke of the shock absorber SA:

1) an extension phase first flow passage D directing fluid flow from the penetrating hole 31b to the lower chamber B through an inner side of the opened extension phase damping valve 12;

2) an extension phase second flow passage E directing fluid flow from the second port 13, the longitudinal hole 23, and the fourth port 14 to the lower chamber B through the outer periphery of the extension phase damping valve 12;

3) an extension phase third flow passage F directing fluid flow from the second port 13, the longitudinal hole 23, and the fifth port 16 to the lower chamber B via the opened extension phase check valve 17; and 4) a bypass flow passage G directing fluid flow from the third port 18 to the lower chamber B through the axial slot 25 and the hollow portion 19.

For the compression phase or during a bounding stroke of the shock absorber SA, the following three flow passages are provided:

1) a compression phase first flow passage H directing fluid flow from the penetrating hole 31a to the upper chamber A through the opened compression phase damping valve 20;

2) a compression phase second flow passage J directing fluid flow from the hollow portion 19, the lateral hole 24, and the first port 21 to the upper chamber A through the opened compression phase check valve 22; and 3) a bypass flow passage G directing fluid flow from the hollow portion 19, the axial slot 25 and the third port 18 to the upper chamber A.

Figure 4:
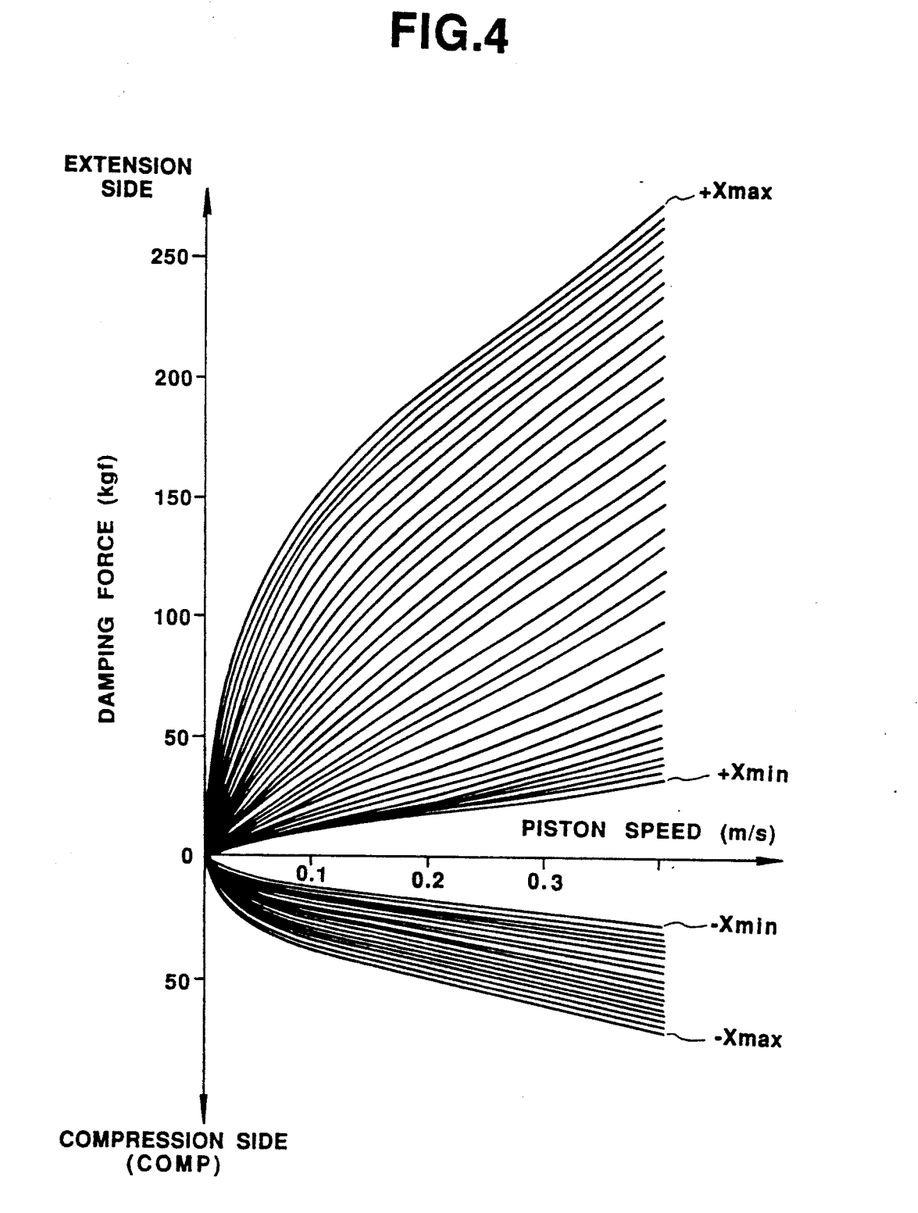
FIG. 4 is a graph which shows a relation between piston speed and damping force of a shock absorber.
Figure 5A:
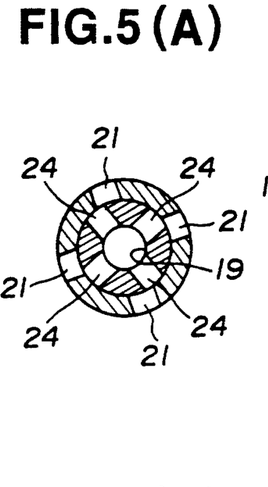
FIG. 5(a) is a cross-sectional view taken along the line K—K in FIG. 3 which shows an adjusting pin at a position ② in FIG. 8.
Figure 5B:
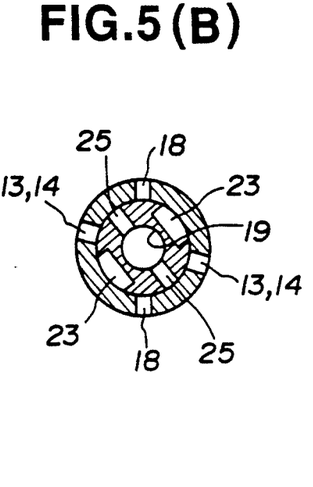
FIG. 5(b) is a cross-sectional view taken along the line M—M in FIG. 3 which shows an adjusting pin at a position ② in FIG. 8.
Figure 5C:
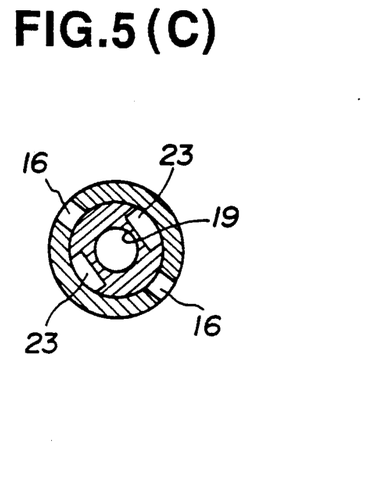
FIG. 5(c) is a cross-sectional view taken along the line N—N in FIG. 3 which shows an adjusting pin at a position ②0 in FIG.8.
Figure 6A:
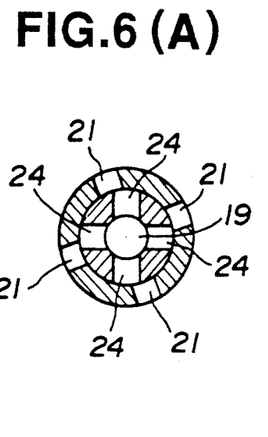
FIG. 6(a) is a cross-sectional view taken along the line K—K in FIG. 3 which shows an adjusting pin at a position ① in FIG. 8.
Figure 6B:
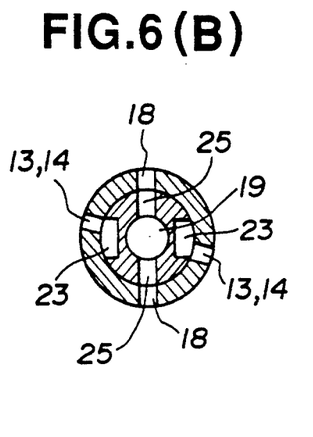
FIG. 6(b) is a cross-sectional view taken along the line M—M in FIG. 3 which shows an adjusting pin at a position ① in FIG. 8.
Figure 6C:
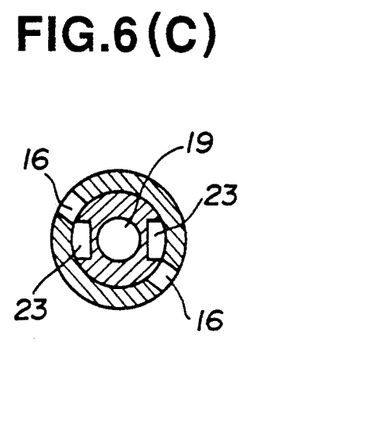
FIG. 6(c) is a cross-sectional view taken along the line N—N in FIG. 3 which shows an adjusting pin at a position ① in FIG. 8.
Figure 7A:
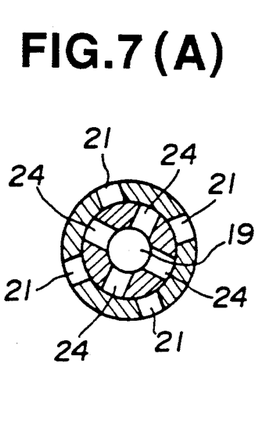
FIG. 7(a) is a cross-sectional view taken along the line K—K in FIG. 3 which shows an adjusting pin at a position ③ in FIG. 8.
Figure 7B:
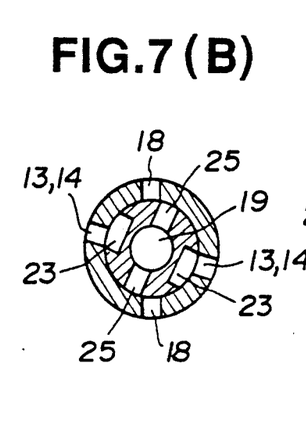
FIG. 7(b) is a cross-sectional view taken along the line M—M in FIG. 3 which shows an adjusting pin at a position ③ in FIG. 8.
Figure 7C:
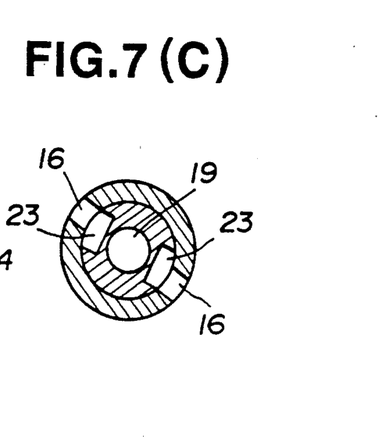
FIG. 7(c) is a cross-sectional view taken along the line N—N in FIG. 3 which shows an adjusting pin at a position ③ in FIG. 8.

With the above arrangements, rotation of the adjusting pin 40 by the pulse motor 2 over a range from first to third positions, as shown in FIGS. 5 to 7, causes a damping coefficient of the shock absorber SA to vary at multiple stages, as shown in FIG. 4, within a range from the lowest damping coefficient Xmin (a soft damping position) to the highest damping coefficient Xmax (a hard damping position) during bounding and rebounding strokes.

Figure 8:
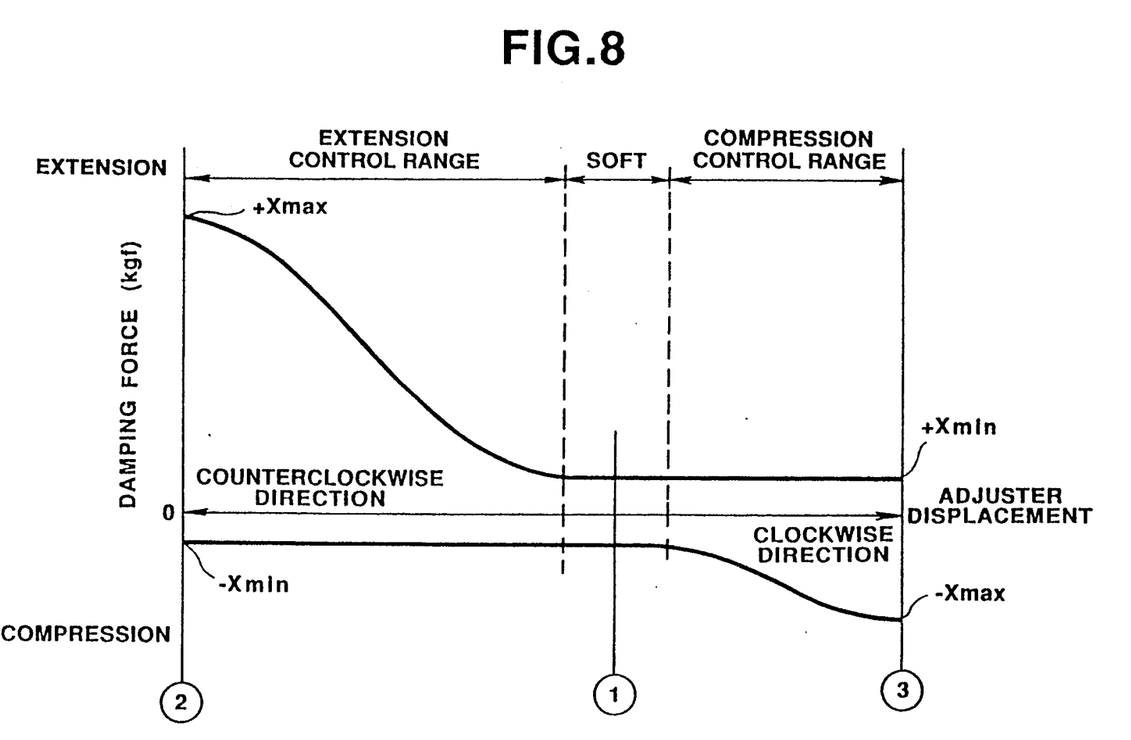
FIG. 8 is a graph which shows a relation between an angular position of an adjusting pin and damping force of a shock absorber.
Figure 9:
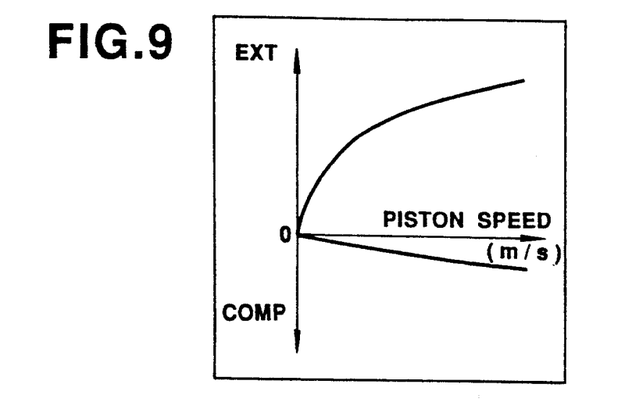
FIGS. 9, 10, and 11 are graphs which show relations between piston speed and damping force when an adjusting pin is arranged at positions ②, ①, and ③ in FIG. 8 respectively.

When the adjusting pin 40 is placed at a position as shown in FIGS. 5(a), 5(b), and 5(c) (i.e., the position ②  in FIG. 8), the extension phase first passage D, the compression phase first flow passage H, and the compression phase second flow passage J establish the fluid communications thereof respectively, thereby causing damping force characteristics to assume the relation as shown in FIG. 9 wherein a high damping coefficient (corresponding to +Xmax in FIG. 4) is established in the rebounding stroke (i.e., during extension), while a low damping coefficient (corresponding to −Xmin in FIG. 4) is established in the bounding stroke (i.e., during compression).

Figures 10, 11:
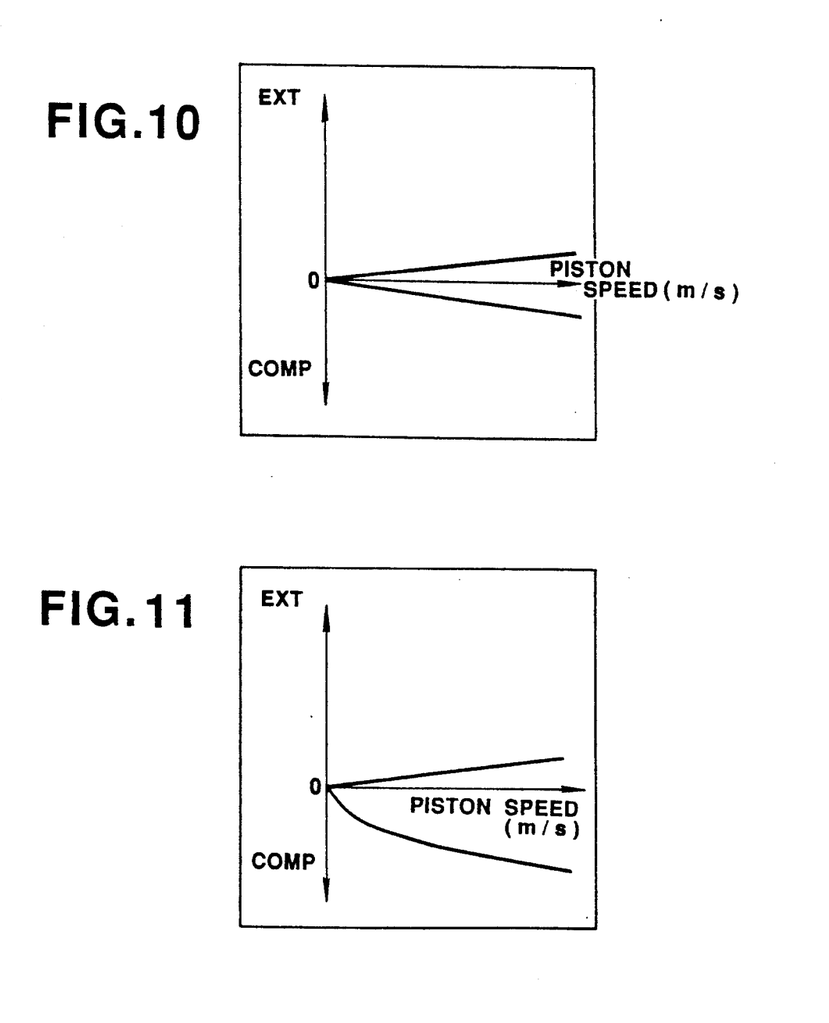

When the adjusting pin 40 is placed at a position as shown in FIGS. 6(a), 6(b), and 6(c) (i.e., the position ① in FIG. 8), the flow passages D, E, F, and G in the rebounding stroke and the flow passages H, J, and G in the bounding stroke accomplishes the fluid communications thereof respectively, thereby causing the damping force characteristics to assume the relation as shown in FIG. 10 wherein the same low damping coefficient (corresponding to ±Xmin in FIG. 4) is provided in both bounding and rebounding strokes.

When the adjusting pin 40 is placed at a position as shown in FIGS. 7(a), 7(b), and 7(c) (i.e., the position ③ in FIG. 8), the extension phase first to third flow passages D, E, and F and the compression phase first flow passage H establish the fluid communications thereof respectively, thereby causing the damping force characteristics to assume the relation as shown in FIG. 11 wherein the high damping coefficient (corresponding to +Xmax in FIG. 4) is established in the bounding stroke, while the low damping coefficient (corresponding to −Xmin in FIG. 4) is established in the rebounding stroke.

It will be noted that rotating the adjusting pin 40 in a counterclockwise direction from the soft position (i.e., the position ① in FIG. 8) causes the damping coefficient to be increased toward the hard damping characteristics only in the rebounding stroke. Alternatively, rotating the adjusting pin 40 in a clockwise direction from the soft position causes the damping coefficient to change toward the hard damping characteristics only in the bounding stroke without any change in the rebounding stroke.

Referring back to FIG. 1, the control unit 5 includes an interface circuit 5a, a CPU (Central Processing Circuit) 5b, and a drive circuit 5c. The CPU is responsive to sensor signals input through the interface circuit 5a from the vertical G sensor, the steering sensor 4, and the vehicle speed sensor 1 to provide control signals to the driving circuit 5c. The drive circuit 5c then provides driving signals to the pulse motors 2 for displacing the adjusting pins 40 of the shock absorbers SA respectively to modify the damping coefficients thereof for anti-rolling motion control.

Figure 12:
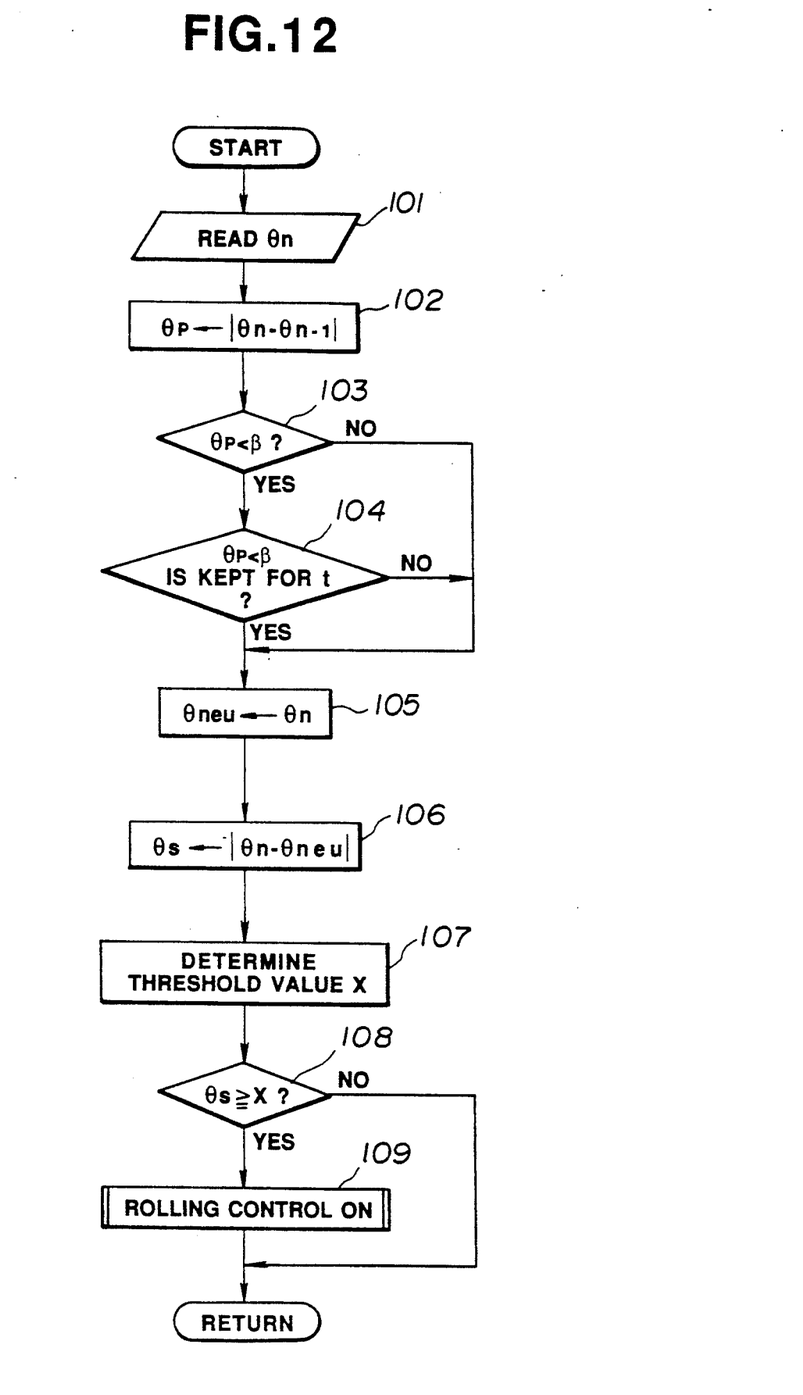
FIGS. 12 is a flowchart which shows logical steps performed by a control unit of a suspension control system.

Referring to FIG. 12, there is shown a flowchart of a program or sequence of the logical steps for anti-rolling motion control performed by the control unit 5.

After entering the program, the routine proceeds to step 101 wherein the control unit 5 reads a steered angle $\theta n$ detected by the steering sensor 4. The routine then proceeds to step 102 wherein a steered angular velocity $\theta p$ is mathematically calculated based on a change rate of the steered angle $\theta n$, or a difference between the present steered angle $\theta n$ and the steered angle one program cycle before $\theta n - 1$. The routine then proceeds to step 103 wherein it is determined whether the steered angular velocity $\theta p$ is smaller than a preselected threshold value $\beta$ or not ($\theta p < \beta$?). If a YES answer is obtained concluding that $\theta p$ is smaller than $\beta$, the routine proceeds to step 104. Alternatively, if a NO answer is obtained concluding that $\theta p$ is greater than or equal to $\beta$, the routine then proceeds directly to step 106.

In step 104, it is determined whether the steered angular velocity $\theta p$ smaller than the threshold value $\beta$ is kept for a preselected period of time t or not. If a NO answer is obtained, the routine then proceeds to step 106. Alternatively, if a YES answer is obtained in step 104, the routine then proceeds to step 105 wherein a central steering angle, or neutral steering angle $\theta neu$ is updated to the current steered angle $\theta n$ detected by the steering sensor 4 in step 101. The neutral steering angle $\theta neu$ is initially set to zero which indicates that the steering wheel is placed at the central position where a vehicle travels straight.

Figure 13:
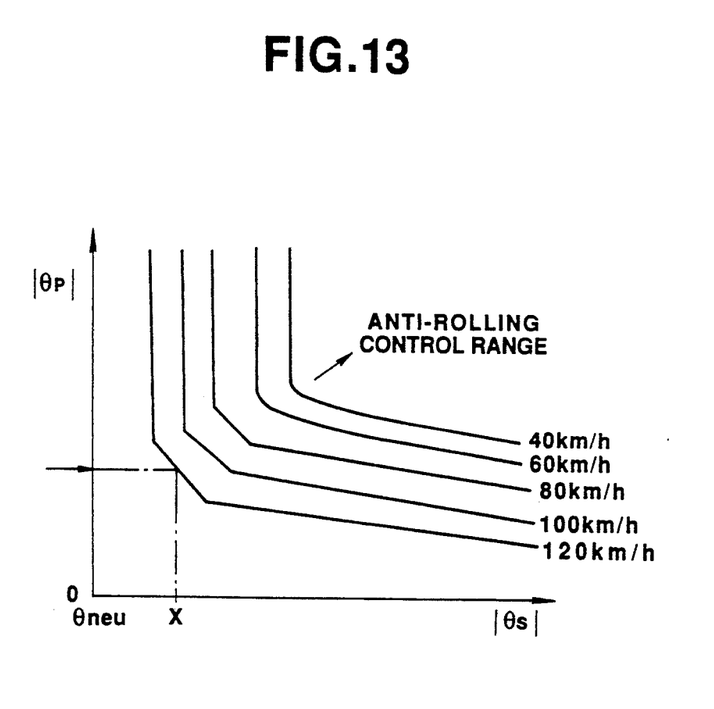
FIG. 13 is a map for determining a threshold value of a steered angle which is determined in a relation to steered angular velocity and vehicle speed.

In step 106, a steered angle difference $\theta s$ between the steered angle $\theta n$ and the neutral steering angle $\theta neu$ is determined. When the neutral steering angle $\theta neu$ has been updated in step 105, a degree of steering operation from the updated neutral steering angle, or additional steered angle is determined. The routine then proceeds to step 107 wherein a threshold value X is determined based on an absolute value of the steered angular velocity $|\theta p|$ and the vehicle speed monitored by the vehicle speed sensor 1 according to a rolling motion control map as shown in FIG. 13.

In the rolling motion control map, the axis of abscissa indicates an absolute value of the steered angle difference $|\theta s|$, while the axis of ordinate indicates an absolute value of the steered angular velocity $|\theta p|$. A plurality of curves represent a threshold value X for the steered angle difference $\theta s$ which is determined in a preselected relation to the absolute value of the steered angular velocity $|\theta p|$ and vehicle speed (km/h). The map shows that the threshold value X is decreased according to increase in the vehicle speed with respect to a particular steered angular velocity $\theta p$ and is also decreased according to increase in the steered angular velocity $\theta p$ with respect to a particular vehicle speed.

In step 108, it is determined whether the absolute value of the steered angle difference $|\theta s|$ is greater than the threshold value X or not ($|\theta s| \geq$ X?). If a YES answer is obtained concluding that the absolute value of the steered angle difference $|\theta s|$ is greater than the threshold value X, the routine then proceeds to step 109 wherein anti-rolling motion control is carried out. Alternatively, if a NO answer is obtained in step 108, the routine is then returned to the initial step, continuing the normal damping coefficient control.

In operation, when a driver turns a steering wheel to steer a vehicle, lateral acceleration acts on a vehicle body to cause it to roll. At this time, when an absolute value of the steered angle difference $|\theta s|$ between the steered angle θn detected by the steering sensor 4 and the neutral steering angle θneu is smaller than the threshold value X which is determined based on an absolute value of the steered angular velocity |θp| and the vehicle speed, a degree of rolling motion when turning is considered to be relatively small even when the steering angular velocity is greater than the preselected threshold value β. Thus, the system carries out the normal damping coefficient control according to a preselected schedule wherein the damping coefficient of the shock absorber SA in the same direction as the vertical speed (±V) of the vehicle body is modified to a high damping coefficient (i.e., hard damping characteristics) which is proportional to the vertical speed (±V).

In detail, when the vertical speed V which is determined based on a detected value of the vertical G sensor 3 is in an upward direction (+), the damping coefficient of the shock absorber in the rebounding stroke (which is arranged at a portion of the vehicle body lifted up caused by the rolling motion) is modified to a higher damping coefficient proportional to a degree of the vertical speed +V, but lower than the damping coefficient +Xmax, while the damping coefficient in the bounding stroke (which is arranged at a portion of the vehicle body lowered caused by the rolling motion) is modified to the low damping coefficient −Xmin at the second position ② in FIG. 8.

When the vertical speed V is in a downward direction (−), the damping coefficient of the shock absorber in the bounding stroke is modified to the higher damping coefficient proportional to the vertical speed −V, but smaller than the damping coefficient −Xmax, while the damping coefficient in the rebounding stroke is modified to the low damping coefficient +Xmin at the third position ③ in FIG. 8.

With the above damping coefficient control, anti-rolling motion control is not effected when the steered angle difference θs is a small value regardless of a degree of the steered angular velocity θp. It will be appreciated that the threshold value β for the steered angular velocity may be set to a relatively small value to enhance sensitivity of the anti-rolling control, thereby preventing a response rate of the anti-rolling motion control when quick and/or additional steering operations are made from being delayed.

Additionally, as mentioned above, the damping coefficient of the shock absorber SA in a stroke similar to a direction of the vertical speed (±V) of the vehicle body is modified to the high damping coefficient proportional to the vertical speed. Thus, the vibration of the vehicle body caused by vibration input from a road surface is attenuated effectively, improving traveling stability and riding comfort. Further, since the damping coefficient of the shock absorber SA in a stroke opposite the direction of the vertical speed (±V) is modified to the low damping coefficient, vibration input from the road surface in a direction opposite the stroke of the shock absorber is absorbed, preventing it from being transmitted to the vehicle body.

When quick steering operation is made at a relatively great steered angle, the vehicle body tends to roll greatly. Thus, the absolute value of the steered angular velocity |θp| becomes greater than the preselected threshold value β and the absolute value of the steered angle difference |θs| also becomes greater than the threshold value X. The system then begins to effect the anti-rolling motion control so that the damping coefficient of the shock absorber SA in the same direction as that of the vertical speed (±V) of the vehicle body is modified to a higher damping coefficient which is further greater than that in the above mentioned normal damping coefficient control, thereby suppressing rolling motion of the vehicle body effectively caused by the quick steering operation with the relatively great steered angle.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims. For example, while the above embodiment utilizes the vertical G sensor 3 for determining vertical speed of a vehicle body and a direction of the vertical speed to modify a damping coefficient of the shock absorber in proportion to the magnitude of the vertical speed, the damping coefficient modification may also be made based on parameters indicative of vehicle speed, relative speed between sprung and unsprung portions, longitudinal acceleration, and/or lateral acceleration.

Additionally, in the above system of the invention, when a steered angular velocity is kept less than a preselected threshold value for a given period of time, the neutral steering angle is updated to a steered angle detected at that time. This may alternatively be accomplished with a high-pass filter which serves to compensate a deviation between an actual steered angle and a relative steered angle from the neutral steered angle.

Further, in the above mentioned suspension system, when a damping coefficient of the shock absorber in one of bounding and rebounding strokes is modified to a higher damping coefficient or harder damping characteristics, while a damping coefficient of the shock absorber in the other stroke is modified to a lower damping coefficient or softer damping characteristics. However, the same damping coefficient may be provided in both the bounding and rebounding strokes.

What is claimed is:

1. A suspension control system for a vehicle comprising:

shock absorbers disposed between a vehicle body and suspension members rotatably supporting wheels respectively, each shock absorber being variable of damping coefficient within a range from softer to harder damping characteristics;

vehicle attitude change determining means for determining a preselected vehicle attitude change parameter to provide a signal indicative thereof;

damping coefficient adjusting means for modifying the damping coefficients of said shock absorbers respectively;

steered angle determining means for determining a steered angle of the vehicle to provide a signal indicative thereof;

steered angular velocity determining means for determining a steered angular velocity of the vehicle to provide a signal indicative thereof; and control means responsive to the signals from said vehicle attitude change determining means, said steered angle determining means, and said steered angular velocity determining means to provide control signals to said damping coefficient adjusting means when the steered angular velocity and the steered angle are greater than preselected first and second threshold values respectively so that the damping coefficients of said shock absorbers in a preselected direction of stroke are modified to a preselected higher damping coefficient which exhibits the harder damping characteristics based on the vehicle attitude change parameter for suppressing rolling motion of the vehicle body, wherein the steered angle is determined based on a steered angle difference from a neutral steered angle of the vehicle, when the steered angular velocity determined by said steered angular velocity determining means is kept less than said first threshold value for a preselected period of time, a value of said neutral steered angle being updated to a value of the steered angle determined by said steered angle determining means.

2. A system as set forth in claim 1, wherein said steered angle determining means is provided with a steering angle sensor which detects a steered angle of a steering wheel, said steered angular velocity determining means determines the steered angular velocity based on a change rate of the steered angle detected by said steering angle sensor.

3. A system as set forth in claim 1, wherein said control means modifies the damping coefficient during a compression stroke of said shock absorber arranged at a portion of the vehicle body lowered caused by the rolling motion to the harder damping characteristics and the damping coefficient during an extension stroke of said shock absorber arranged at a portion of the vehicle body lifter up caused by the rolling motion to the harder damping characteristics.

4. A system as set forth in claim 3, wherein said control means modifies the damping coefficient during the extension stroke of said shock absorber arranged at the portion of the vehicle body lowered caused by the rolling motion to softer damping characteristics and the damping coefficient during the compression stroke of said shock absorber arranged at the portion of the vehicle body lifted up caused by the rolling motion to the softer damping characteristics.

5. A system as set forth in claim 1, wherein said vehicle attitude change determining means includes vertical acceleration sensors mounted adjacent said shock absorbers to detect vertical accelerations of the vehicle body, said control means determining vertical speeds of based on the detected vertical accelerations to control said damping coefficient adjusting means so that the damping coefficients of said shock absorbers are modified proportional to the the vertical speeds respectively.

6. A system as set forth in claim 1, wherein said damping coefficient adjusting means includes adjusting pins each serving to modify a flow passage cross sectional area of said shock absorber for adjusting the damping coefficient of the shock absorber.

7. A suspension control system for a vehicle comprising:
shock absorbers disposed between a vehicle body and suspension members rotatably supporting wheels respectively, each shock absorber being variable of damping coefficient within a range from softer to harder damping characteristics;
vehicle attitude change determining means for determining a preselected vehicle attitude change parameter to provide a signal indicative thereof;
damping coefficient adjusting means for modifying the damping coefficients of said shock absorbers respectively;
steered angle determining means for determining a steered angle of the vehicle to provide a signal indicative thereof;
steered angular velocity determining means for determining a steered angular velocity of the vehicle to provide a signal indicative thereof; and
control means responsive to the signals from said vehicle attitude change determining means, said steered angle determining means, and said steered angular velocity determining means to provide control signals to said damping coefficient adjusting means when the steered angular velocity and the steered angle are greater than preselected first and second threshold values respectively so that the damping coefficients of said shock absorbers in a preselected direction of stroke are modified to a preselected higher damping coefficient which exhibits the harder damping characteristics based on the vehicle attitude change parameter for suppressing rolling motion of the vehicle body, wherein said second threshold value is determined in a preselected relation to the steered angular velocity.

8. A suspension control system for a vehicle comprising:
shock absorbers disposed between a vehicle body and suspension members rotatably supporting wheels respectively, each shock absorber being variable of damping coefficient within a range from softer to harder damping characteristics;
vehicle attitude change determining means for determining a preselected vehicle attitude change parameter to provide a signal indicative thereof;
damping coefficient adjusting means for modifying the damping coefficients of said shock absorbers respectively;
steered angle determining means for determining a steered angle of the vehicle to provide a signal indicative thereof;
steered angular velocity determining means for determining a steered angular velocity of the vehicle to provide a signal indicative thereof; and
control means responsive to the signals from said vehicle attitude change determining means, said steered angle determining means, and said steered angular velocity determining means to provide control signals to said damping coefficient adjusting means when the steered angular velocity and the steered angle are greater than preselected first and second threshold values respectively so that the damping coefficients of said shock absorbers in a preselected direction of stroke are modified to a preselected higher damping coefficient which exhibits the harder damping characteristics based on the vehicle attitude change parameter for suppressing rolling motion of the vehicle body, wherein said second threshold value is determined in a preselected relation to the steered angular velocity and vehicle speed.

* * * * *